US008984577B2

(12) United States Patent
Baldwin et al.

(10) Patent No.: US 8,984,577 B2
(45) Date of Patent: Mar. 17, 2015

(54) CONTENT SIGNATURING

(75) Inventors: James Baldwin, Palo Alto, CA (US);
Dennis George Cronin, Redmond, WA
(US); Ron Morris, Seattle, WA (US);
David Sloo, Menlo Park, CA (US)

(73) Assignee: Microsoft Technology Licensing, LLC,
Redmond, WA (US)

( * ) Notice: Subject to any disclaimer, the term of this
patent is extended or adjusted under 35
U.S.C. 154(b) by 932 days.

(21) Appl. No.: 12/877,910

(22) Filed: Sep. 8, 2010

(65) Prior Publication Data

US 2012/0056752 A1    Mar. 8, 2012

(51) Int. Cl.
| H04N 7/173 | (2011.01) |
| H04N 21/462 | (2011.01) |
| H04N 21/258 | (2011.01) |
| H04N 21/44 | (2011.01) |
| H04N 21/482 | (2011.01) |
| H04N 21/658 | (2011.01) |

(52) U.S. Cl.
CPC ..... *H04N 21/4622* (2013.01); *H04N 21/25891*
(2013.01); *H04N 21/44008* (2013.01); *H04N*
*21/4826* (2013.01); *H04N 21/6582* (2013.01)
USPC ............................ 725/132; 725/140; 709/231

(58) Field of Classification Search
CPC  H04N 7/17318; H04N 21/235; H04N 21/435
USPC .................. 725/85, 100, 131–134, 139–142,
725/151–153; 709/217–232
See application file for complete search history.

(56) References Cited

U.S. PATENT DOCUMENTS

| 6,008,836 | A | 12/1999 | Bruck et al. |
| 6,493,008 | B1 | 12/2002 | Yui |
| 6,633,651 | B1 * | 10/2003 | Hirzalla et al. ............... 382/100 |
| 7,712,114 | B2 | 5/2010 | Ramaswamy |
| 8,209,724 | B2 * | 6/2012 | Rathod et al. .................. 725/53 |
| 2002/0110360 | A1 | 8/2002 | Potrebic |

(Continued)

FOREIGN PATENT DOCUMENTS

| CN | 1339222 A | 3/2002 |
| CN | 101267498 A | 9/2008 |

(Continued)

OTHER PUBLICATIONS

State Intellectual Property Office of China, Office Action of Chinese Patent Application No. 201110285453.X, Dec. 9, 2013, 13 pages.

(Continued)

*Primary Examiner* — Annan Shang
(74) *Attorney, Agent, or Firm* — Micah Goldsmith; Judy Yee; Micky Minhas

(57) ABSTRACT

A light source package for selectively interrupting power to a light source is provided. An optical element is positioned to reflect a reflected portion of the light from the light source. The reflected portion impinges upon a base that includes a roof panel with a light source side and a sensor side that is opposite to the light source side. The light source side of the roof panel receives the reflected portion of the light and transmits a transmitted portion of the light through the roof panel. The sensor side of the roof panel includes a recess in which a sensing component is located. The sensing component receives the transmitted portion of the light and is configured to interrupt power to the light source when the transmitted portion of the light is below a threshold.

16 Claims, 3 Drawing Sheets

(56) References Cited

U.S. PATENT DOCUMENTS

| | | | |
|---|---|---|---|
| 2004/0205821 | A1 | 10/2004 | Yamada et al. |
| 2005/0235312 | A1 | 10/2005 | Karaoguz et al. |
| 2006/0210157 | A1 | 9/2006 | Agnihotri et al. |
| 2007/0011702 | A1 | 1/2007 | Vaysman |
| 2007/0028111 | A1 | 2/2007 | Covely |
| 2008/0167128 | A1 | 7/2008 | Roshak et al. |
| 2008/0266449 | A1 | 10/2008 | Rathod et al. |
| 2008/0270373 | A1 | 10/2008 | Oostveen et al. |
| 2009/0083781 | A1 | 3/2009 | Yang et al. |
| 2009/0094113 | A1* | 4/2009 | Berry et al. .......... 705/14 |
| 2009/0320073 | A1 | 12/2009 | Reisman |
| 2011/0010431 | A1 | 1/2011 | Rooks et al. |

FOREIGN PATENT DOCUMENTS

| | | |
|---|---|---|
| CN | 101385006 A | 3/2009 |
| KR | 20080006168 A | 1/2008 |
| KR | 20100040545 A | 4/2010 |
| WO | 01/62004 A2 | 8/2001 |
| WO | 2007038806 A2 | 4/2007 |

OTHER PUBLICATIONS

State Intellectual Property Office of China, Office Action of Chinese Patent Application No. 201110285408.4, Feb. 7, 2014, 10 pages.
"International Search Report", Mailed Date: Feb. 17, 2012, Application No. PCT/US2011/046134, Filed Date: Aug. 1, 2011, pp. 8.
"Industry Leaders Announce Open Platform to Bring Web to TV", Retrieved at <<http://www.intel.com/pressroom/archive/releases/20100520corp.htm>> Published Date: May 20, 2010, p. 1.
Grant, Mike, "The future of TV—will Internet-connected TV learn from mobile?", Retrieved at <<http://www.analysysmason.com/About-Us/News/Newsletter/The-Future-of-TV--will-Internet-connected-TV-learn-from-mobile/>> Published Date: Feb. 15, 2010, p. 1.
Zhang, Yongjun, "A Java 3D Framework for Digital Television Set-top Box", Retrieved at <<http://www.tkk.fi/Units/IDC/brocom/sub/terminal/master/Java_3D_stb.pdf>> Published Date: Oct. 15, 2003. p. 57.
"Web TV", Retrieved at <<http://www.argela.com/solutions.php?cid=itv&sid=webtv>>Retrieved Date: Jun. 14, 2010, p. 3.
State Intellectual Property Office of the People's Republic of China, Office Action of Chinese Patent Application No. CN201110285408.4, Aug. 1, 2013, 9 pages.
Korean Intellectual Property Office, International Search Report and Written Opinion of PCT/US2011/047102, WIPO, Feb. 28, 2012, 9 pages.
European Patent Office, European Search Report of EP11823915.1, Sep. 18, 2013, Germany, 3 pages.
European Patent Office, Summons and Office Action of European Patent Application No. 11823915.1, Sep. 1, 2014, 3 Pages.
European Patent Office, Examination Report of European Patent Application No. 11823915.1, Sep. 25, 2013, Germany, 4 Pages.
State Intellectual Property Office of the People's Republic of China, Notice on the Third Office Action of 201110285408.4, Jul. 3, 2014, 6 pages.

* cited by examiner

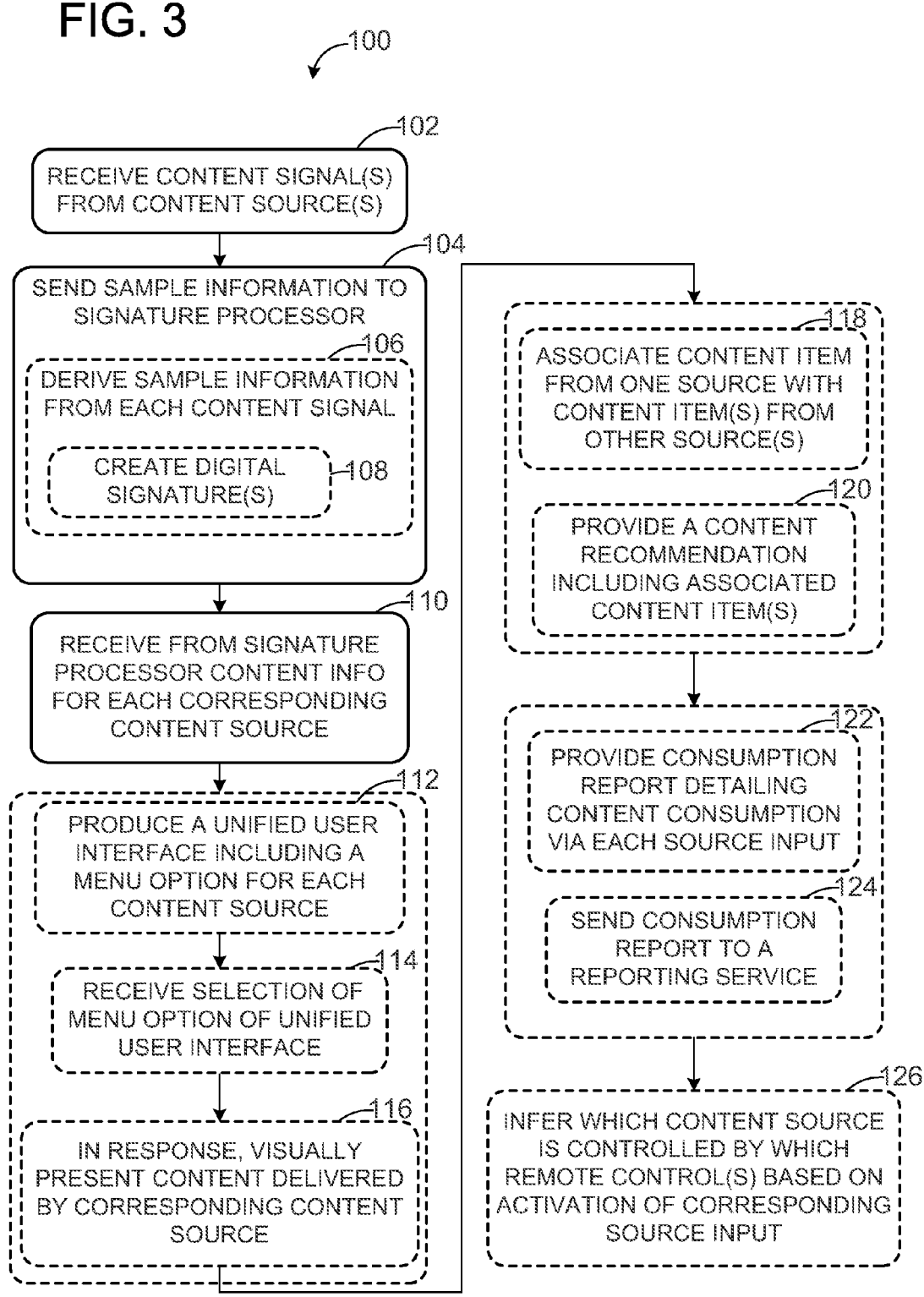

CONTENT SIGNATURING

BACKGROUND

A display device may receive content from a variety of different sources. As an example, in addition to displaying media from a subscription service such as television programming, a television may also be connected to various peripheral devices such as DVD players, Blu-ray players, digital video recorders, gaming systems, home computers, etc. Further, in some cases a display device may be further configured to receive content from other sources, such as streaming services, the Internet, etc.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to one aspect of the disclosure, content signaturing is provided. For example, in one disclosed embodiment a display receiver device comprises one or more source inputs, where each source input is configured to receive a content signal from a corresponding content source. The display receiver device further comprises a content identification module to send sample information derived from each received content signal to a signature processor and to receive from the signature processor content information for each corresponding content source, the content information for a particular content source indicating a content item embodied by the content signal received from that particular content source. The display receiver device further comprises an association module to associate the content item corresponding to the particular content source with one or more associated content items not corresponding to the particular content source.

BRIEF DESCRIPTION OF THE DRAWINGS

FIG. 3 shows a flow diagram of an example method of providing content signaturing.

DETAILED DESCRIPTION

Figure 1:
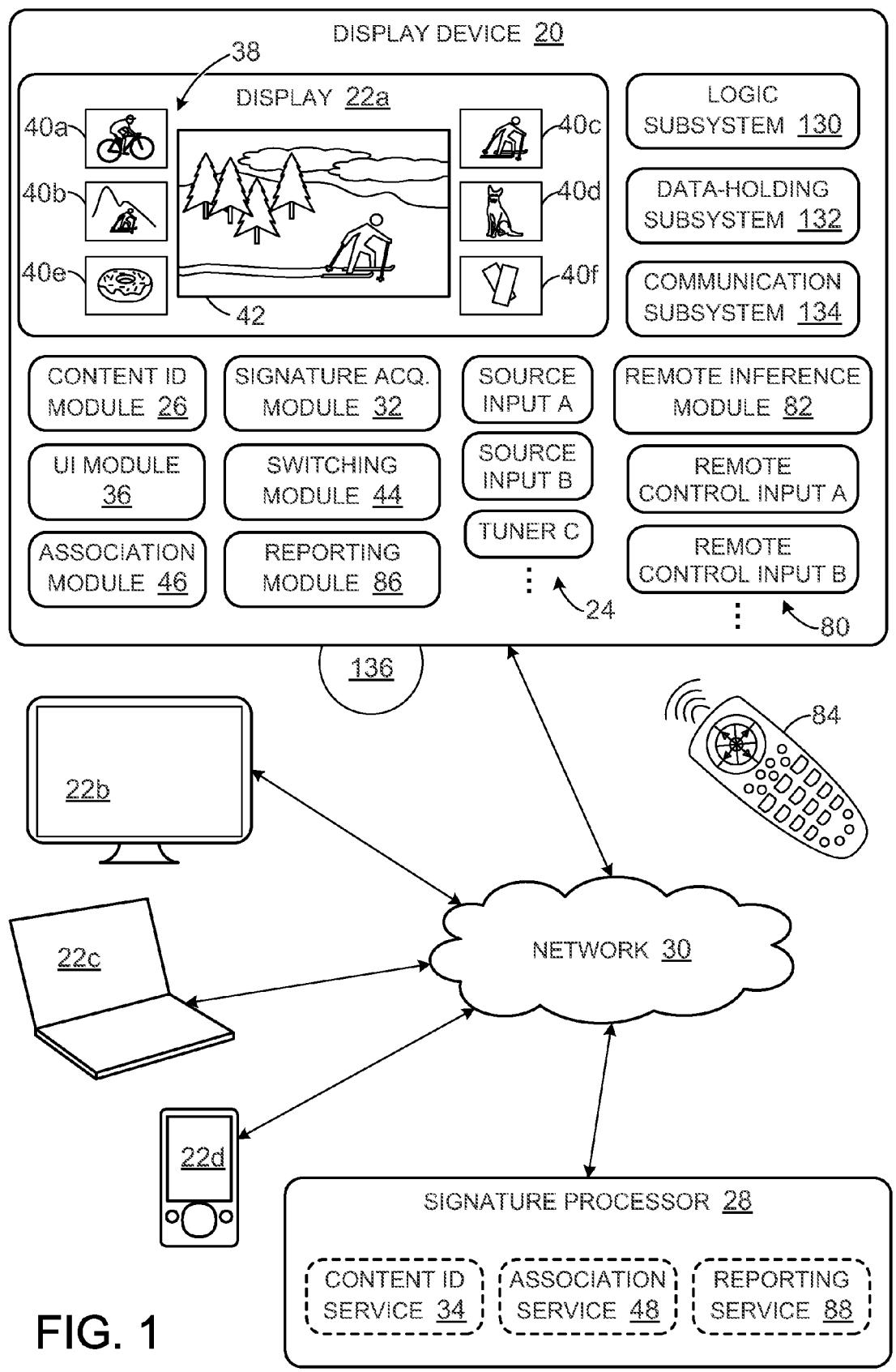
FIG. 1 shows an example use environment for content signaturing in accordance with embodiments of the present disclosure.

Display receiver devices may receive content from a number of different sources. These sources may utilize different technologies, and may even utilize different user input devices for accessing menus associated with the devices. For example, a display receiver device in the form of a television may be configured to interface with a DVD player, a media center computer, a movie-streaming service, and a digital video recorder, and yet each of these devices may have its own user interface, and oftentimes may be accessed by its own remote controller. Moreover, each time a user desires to watch content from a different source, the user may have to indicate on the television which source input to utilize (e.g., SOURCE 1, SOURCE 2, SOURCE 3, etc.). Not only can this be cumbersome for the user, but typically the inputs do not indicate which input is associated with which device, so a user typically cycles through the source inputs until the desired source is selected. Furthermore, it may be challenging for a user to have a rich user experience with such a system since the content sourced to the display lacks any sort of interconnectivity.

Content signaturing allows a display receiver device to identify different content from a variety of sources. Signaturing allows the display receiver device to identify the content regardless of the source the content comes from and without that source having to be specially configured to report content information to the display receiver device. A display receiver device that is configured to signature content in this way may provide a unified user interface through which a user may interact to select content from various sources and/or to discover other relevant content. In this way, content from various disparate sources may be accessed through a single user interface presented on a display. Further, since the content is identified by the display receiver device, the unified user interface may display information about each content item in addition to providing an access point to the content item. Further yet, content from different sources may be associated with the identified content. Such a display receiver device may be further configured to provide a unified approach for interacting with the various sources based on inferences about which content source is controlled by which remote control, and/or provide consumption reports detailing content consumption behavior on that display device.

In some embodiments, a display receiver device may take the form of a display that includes a display screen for visually presenting the content. In other embodiments, a display receiver device may take the form of a set top box and/or peripheral receiver that is connected to a display screen that visually presents the content. The following description equally applies to both embodiments. The term "display" is used below to refer to both a stand-alone display device including an integrated display screen and a peripheral unit connected to a display screen.

Turning now to FIG. 1, FIG. 1 illustrates a display device 20 configured to display content on a display 22a. As an example, display device 20 may be a television. It should be appreciated, however, that display device 20 with display 22a is just one example of a suitable display device. Thus, other suitable display devices include, but are not limited to, a computer monitor including a display 22b, a laptop including a display 22c, a mobile computing device including a display 22d, a peripheral device configured to be connected to a display, etc. While the following discussion primarily focuses on display device 20, it is to be understood that the content signaturing and related functionality may be implemented on a wide range of different content delivery devices.

Display device 20 may be configured to receive content for visual presentation on display 22a from a variety of sources. Some content sources may be peripheral content sources, such as external devices attached to display device 20. Examples include, but are not limited to, a DVD player, a Blu-ray player, a set top box, a media center computer, a digital video recorder, a gaming console, etc. Other content sources may be integrated content sources which are directly integrated into display device 20, such as a built-in television tuner. Some content sources, whether peripheral or integrated, may be network content sources configured to receive content via a network 30, such as a movie-streaming service, Internet television, etc.

Content may be received via one or more source inputs 24 of display device 20, wherein each source input is configured to receive a content signal from a corresponding content source. As an example, Input A may receive a content signal from a DVD player, Input B may receive a content signal from a gaming console, Tuner C may receive a content signal from a television tuner, etc.

In addition to displaying content received from various content sources, display device 20 may be configured to monitor the content signal at each input. For example, display device 20 may be configured to sample each content signal, so as to obtain sample information from each received content signal. Such sample information may then be utilized to identify the content from each of the sources, as described hereafter, so as to provide a richer user experience.

As illustrated in FIG. 1, display device 20 may further include a content identification module 26 for assisting in the identification of content from various content sources. Thus, although the content sources may not be related to one another, content identification module 26 allows the content from each of the sources to not only be identified, but also associated with one another and/or content from other sources, as described in more detail as follows.

Content identification module 26 may be configured to send sample information derived from each received content signal to a network-accessible remote service, such as a signature processor 28 accessible via a network 30 (e.g., the Internet). Display device 20 may derive such sample information in any suitable manner. For example, since display device 20 is configured to monitor the video and audio signals input to display device 20 from various sources, sample information derived from these signals may then be made available for content signaturing. As such, in some embodiments, display device 20 may further include a local signature acquisition module 32 to sample the content signal received by each source input and to prepare the sample information for content identification module 26. The sample information may be derived from audio aspects of the content signal, video aspects of the content signal, ancillary data aspects (e.g., closed captioning, metadata, etc.) associated with the content signal, or other aspects of the received content signal.

In some embodiments, the sample information may include a digital signature derived from the received content signal. Thus, signature acquisition module 32 may be configured to perform such content signaturing. Such signaturing may include performing segmentation of the content, analyzing each segment, and/or providing metrics along various parameters.

In some embodiments, signaturing may include sending received content to signature processor 28 for remote processing. In such embodiments, the sample information sent to the signature processor may be a short segment of raw and/or compressed content.

In some embodiments, a digital signature may be derived from a video aspect of the received content signal. This may include dynamic chroma and luminance changes and/or object recognition such as face recognition, character recognition, etc. The digital signature may additionally or alternatively be derived from an audio aspect of the received content signal, such as an audio signature, a sequence of musical notes, a vector representation of audio dynamics and/or intensity, speech-to-text analysis, etc. Further yet, in some embodiments the digital signature may additionally or alternatively be derived from an ancillary data aspect of the received content signal, such as a digital encoding format and/or subformat(s), and/or embedded metadata such as closed caption information, DVB subtitles, etc.

Further, in some embodiments such signaturing may include multivariate signaturing, allowing content to be identified based on sampling wherein full information may not be available. In such a case, segmentation may be performed based on data aspects in the current streams. However, additional data may be utilized, such as that from extrinsic data sources (e.g., a separate metadata stream) to increase the accuracy of the signaturing. As a nonlimiting example, in some embodiments the multivariate signature may be encoded as a matrix of vectors.

Continuing with FIG. 1, signature acquisition module 32 of display device 20 may be configured to sample content signals in any suitable manner. For example, in some embodiments, signature acquisition module 32 may be configured to sequentially sample content signals received by different source inputs. As an example, signature acquisition module 32 may be configured to sequentially sample source inputs 24 of display device 20 once per minute. In some embodiments, signature acquisition module 32 may alternately sample the various source inputs, creating a relevant video and audio snapshot from each source input at a particular interval. Such an approach may be suitable for a display device that may not be capable of simultaneously decoding all possible input channels. However, more advanced display devices may have the resources and capability for signature acquisition module 32 to concurrently sample content signals received by two or more source inputs. Further, in some embodiments, signature acquisition module 32 may be configured to presample content signals received by different source inputs when the display is turned off.

Sample information, whether raw, compressed, or pre-processed, may then be sent to signature processor 28 via network 30. Signature processor 28 may be configured to receive the sample information in any suitable manner. As an example, signature processor 28 may include service(s) corresponding to module(s) of display device 20. For example, signature processor 28 may include a content identification service 34 configured to receive sample information from content identification module 26.

Signature processor 28 may be configured to perform matching of a digital signature to a digital content fingerprint in a database of digital content fingerprints, for example, using content identification service 34. For example, in the case of a multivariate signature encoded as a matrix of vectors, content identification service 34 may be configured to analyze the matrix of vectors, and find the most likely match for this matrix among a large database of related content that has been previously analyzed.

Further, such processing may include utilizing information derived from content signaturing for performing queries (e.g., via content identification module 26 and/or content identification service 34), such as a query on an Internet search engine. Such queries may provide a useful data stream that is not a broadcast data stream. Further, information from audio and video aspects of the signaturing may be combined with information from ancillary data aspects of the signaturing for additional analysis. Such analysis may confirm that the content item has been identified correctly, for example.

In some cases, such processing may include analyzing sample information to generate additional markup. For example, closed captioning data of a particular content item may be analyzed to determine additional markup for amending the metadata of that content item.

Upon obtaining and processing the sample information, signature processor 28 may be configured to send (e.g., via content identification service 34) content information back to content identification module 26. Accordingly, content identification module 26 is configured to receive such content information for each corresponding content source from signature processor 28.

The content information for the corresponding content source may indicate a content item embodied by the content signal received from that corresponding content source and from which the sample information is derived. Examples of content items may include, but are not limited to, a television show, a movie, a game, an internet video, etc. The content information may include any suitable information related to the content item, such as a program title, program rating, user rating, list of actors, summary, year made, etc. In this way, by performing the sample-based signaturing of inputs at the device level, and transmitting the signature information to an analysis service for remote processing, all content being sourced to display device 20 may be identified regardless of the source.

Continuing with FIG. 1, display device 20 may be further configured to provide a user interface based on the content information received from signature processor 28. As an example, display device 20 may include a user interface module 36 to produce a unified user interface including a menu option for each content source. In addition to providing an access point to the associated content, each menu option may further include content information identified via content identification module 26 for the corresponding content source, described as follows.

For example, each menu option may include an image captured from the content signal received from the corresponding content source, such as a screenshot from the content item. As another example, each menu option may include an image included as part of the content information received from the signature processor for the corresponding content source, such as a movie poster, promotional game image, etc. As yet another example, each menu option may include a title included as part of the content information received from the signature processor for the corresponding content source, and/or any other such textual or other information included in the content information.

Such a unified user interface may be visually presented on display 22a, such as illustrated at 38. For example, each menu option 40a-40f may include a screen shot of what is available from that source (e.g., as sampled) and the title (e.g., as determined by content identification module 26 and signature processor 28). In some embodiments, these menu options may be displayed alongside a content item currently being displayed for primary viewing, such as content item 42. In some embodiments the menu options (e.g., menu options 40a-40f) will include static images while the currently active content item (e.g., content item 42) includes moving images and active sound.

Display device 20 may include a switching module 44 which is configured to cause display 22a to visually present content delivered by the corresponding content source responsive to selection of a corresponding menu option of the unified user interface. It should be appreciated that visually presenting such content may be done in any suitable manner. For example, in some embodiments, the selected content may be brought into focus for primary viewing, for example, by replacing the content currently being displayed for the user (e.g., content item 42) with the selected content. In other words, the content item associated with the selected menu option is shown with moving images and active sound. In such a case, the menu options associated with the unified user interface may remain displayed. However, in some embodiments, the selected content may be brought into view, and all other content (e.g., content item 42, menu options 40a-40f, etc.) may be removed from view, so as to effectively "change the channel." In this way, a user may switch between various video and audio input devices using images, text, audio, and/or other content-specific information as selectable menu items.

Content signaturing further provides for content from the various sources to be associated with one another. Thus, display device 20 may further include an association module 46 to associate the content item corresponding to the particular content source with one or more associated content items not corresponding to the particular content source. Such association can be done in any suitable manner. For example, display device 20 may utilize a local or remote database to manage digital signature information. In this way, association module 46 may itself look for correlations between different entries and/or other information (e.g., metadata from a program guide, a search engine, etc.).

As another example, in some embodiments, association module 46 may be configured to cooperate with a remote service to associate content, such as a remote association service 48 of signature processor 28. In such a case, association module 46 may cooperate with a association service 48 to associate the content item corresponding to the particular content source with one or more associated content items not corresponding to the particular content source. In this way, signature processor 28 provides an analysis engine to determine associations that are then sent back to display device 20, such that association module 46 may then associate the content.

Association module 46 may be configured to provide a content recommendation including the one or more associated content items. Such a content recommendation may indicate specific content items available to display device 20 (e.g., via source inputs 24) that are related to another of the content items available to display device 20. For example, a content recommendation may indicate that the same content received via a first input is available, or will be available, to display device 20 in a different format via a second input. As another example, a content recommendation may indicate that a continuation of the content (e.g., a subsequent episode, a next disc of a television series, etc.) received via an input is available, or will be available, to display device 20 via another input. As yet another example, a content recommendation may indicate that related content (e.g., content with the same actor(s), director, subject matter, rating, etc.) is available, or will be available, via another input.

Further, association module 46 may be configured to record the one or more associated content items. For example, if the content recommendation indicates that the next episode is available via television programming, association module 46 may signal a digital video recorder to record the episode when the episode is broadcast.

Association module 46 may be further configured to provide permission for the one or more associated content items to be accessed via another device. Thus, if display device 20 is currently playing a movie, for example, association module 46 may allow the user to watch the movie on another display, such as display 22c of the user's laptop. A central permissions server may be utilized to facilitate such permissions.

Thus, whereas traditionally display devices present a user with fragmented content, content signaturing as described herein allows a display device to identify and associate the content being sourced to its various inputs.

Figure 2:
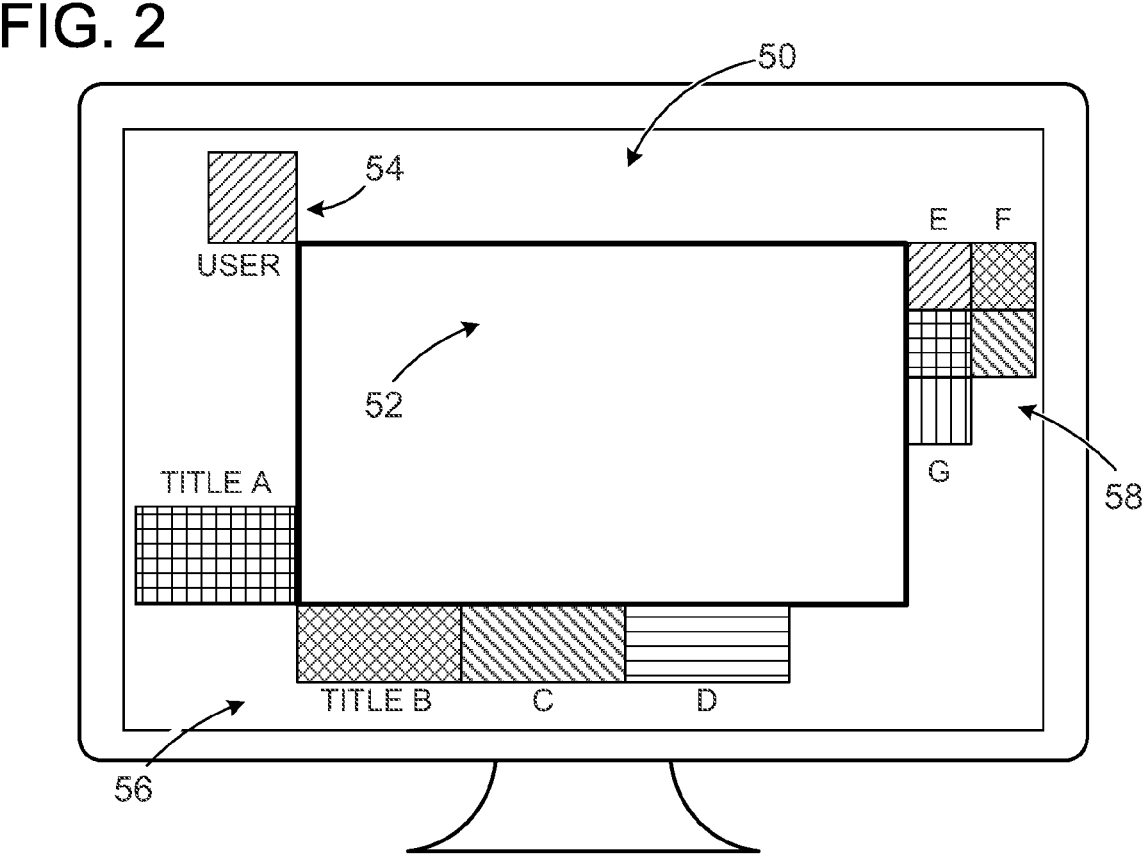
FIG. 2 schematically shows an example of an embodiment of a unified user interface.

FIG. 2 illustrates an example layout for a unified user interface 50, wherein a current view 52 is utilized to display content currently being displayed for the user. At 54, an image corresponding to the user's profile may be displayed. At 56, menu options for content from connected devices may be displayed. At 58, menu options for content from virtual services may be displayed, such as associated video clips available via the Internet. In this way, content from different content sources, whether physical inputs to the display device or virtual inputs over a network (e.g., the Internet), are displayed for the user. Each of the menu options provides a visual indication of the actual content that is available from the source corresponding to that particular menu option. As described above, a particular menu option may be selected (e.g., using a remote control, a game controller, vision input, voice input, or another input mechanism) in order to cause the display device to present the content corresponding to that menu option.

Moreover, whereas traditional home entertainment systems typically suffer from decentralized control, display device 20 may be further configured to provide centralized control, allowing a user to interact with the variously-sourced content in a centralized manner by relating individual remote control mechanisms to one another, so as to infer functionality of the input device. As such, display device 20 may further include one or more remote control inputs 80, wherein each remote control input is configured to receive a remote command signal from one or more remote controls, each remote control corresponding to a particular content source. The individual remote control inputs may include infrared inputs, radio frequency inputs, wireless network inputs, etc.

Display device 20 may further include a remote inference module 82 to infer which content source is controlled by a remote control 84 based on an activation of a corresponding source input. In some embodiments, such inferring may occur during a natural learning phase. For example, remote inference module 82 may determine that each time a user presses a button on remote control 84 associated with a particular command, they also press other buttons on other remote controls associated with other functionalities. As such, remote inference module 82 may "learn" that a selection of the button on remote control 84 corresponds to signaling commands for all of these functionalities.

Remote inference module 82 may be configured to provide centralized control in any suitable manner. For example, in some embodiments, remote inference module 82 may allow display device 20 to essentially take over the behavior itself. In such a case, upon learning the behavior that is to be implemented in response to a selection on remote control 84, display device 20 may signal such behavior.

However, in some embodiments, remote inference module 82 may allow additional functionality to be provided to remote control 84. For example, upon inferring functionality to be associated with a particular button, remote inference module 82 may send a functionality update directly to remote control 84 to update the programming of remote control 84. However, in other embodiments, remote inference module 82 may send updated programming based on learned inferences to remote control 84 over a network, such as network 30.

In this way, whereas traditionally the burden is on the user to program a remote control, display device 20 can essentially "watch" all remotes and observe the effect each signal received from a particular remote has on the content on the display. As such, the display device may infer how the audio/video system is set up, and how the remotes are set up.

Moreover, display device 20 may be further configured to automatically switch (e.g., via switching module 44) to a source input corresponding to the content source that the remote inference module has inferred is controlled by the remote control.

Display device 20 may be further configured to provide information regarding the consumption at each input.

Accordingly, display device 20 may further include a reporting module 86 to provide a consumption report detailing content consumption via each source input. In some embodiments, reporting module 86 may be configured, for example, to use content information received via content identification module 26 to provide the consumption report. The consumption report may include any suitable information, such as information regarding the content that is played (e.g., title, channel, etc.), the source from which the content originated, the times and durations at which the content is played, at which points during playback is content playback stopped, what content is switched to when content playback is stopped (i.e., what subsequent content item, as identified via the content identification module, interrupts viewing of a preceding content item), ambient noise levels in a viewing environment (e.g., as measured by a microphone) at different points in content playback, user profile information, or virtually any other type of reportable information. In this way, the consumption data may provide a full history of a user's viewing behavior.

Further, reporting module 86 may be configured to send the consumption report to a reporting service 88 via network 30. In other embodiments, reporting module 86 may be configured to transmit the consumption report to an aggregation service over low-bandwidth connections.

Reporting service 88 of signature processor 28 may be configured to analyze consumption report(s). Such analysis may be utilized, for example, to provide targeted, relevant content suggestions to the user. Analysis of consumption reports may include content analysis, user interface analysis, device analysis, user viewing behavior analysis, etc. Moreover, such analysis may include aggregation of consumption reports across several users to determine trends among user populations, which may be valuable to content providers, advertisers, and/or other parties interested in the content consumption trends of a particular population and/or targeted demographic.

Turning now to FIG. 3, FIG. 3 illustrates an example method 100 of providing content signaturing. At 102, method 100 includes receiving a content signal from one or more content sources. Each signal may be received, for example, via a source input. At 104, method 100 includes sending sample information derived from each received content signal to a signature processor. In some embodiments, method 100 may optionally include deriving the sample information from each received content signal, as indicated at 106. Further, in some embodiments, deriving a digital signature from the received content signal, as indicated at 108.

At 110, method 100 includes receiving from the signature processor content information for each corresponding content source. At 112, method 100 optionally includes producing a unified user interface including a menu option for each content source. Each menu option may include, for example, content information identified for the corresponding content source.

In some embodiments, method 100 may optionally include receiving a selection of a menu option of the unified user interface, as indicated at 114. Accordingly, at 116, method 100 may optionally include visually presenting content delivered by the corresponding content source responsive to such a selection.

Further, in some embodiments, method 100 may optionally include associating one or more content items corresponding to a particular content source with one or more associated content items not corresponding to the particular content source, as indicated at 118. In some embodiments, such association may include providing a content recommendation including the one or more associated content items, as indicated at 120.

Further yet, in some embodiments, method 100 may optionally include providing a consumption report detailing content consumption via each source input as indicated at 122. In such a case, method 100 may further include sending the consumption report to a reporting service, as indicated at 124.

Further yet, in some embodiments, method 100 may optionally include inferring which content source is controlled by which of one or more a remote controls, as indicated at 126. As an example, such inferring may be performed during a natural learning phase.

In some embodiments, the above described methods and processes may be tied to a computing system including one or more computers. In particular, the methods and processes described herein may be implemented as a computer application, computer service, computer API, computer library, and/or other computer program product.

FIG. 1 schematically shows a nonlimiting computing system in the form of display device 20 that may perform one or more of the above described methods and processes. Display device 20 is shown in simplified form. It is to be understood that virtually any computer architecture may be used without departing from the scope of this disclosure. In different embodiments, display device 20 may take the form of a television, desktop computer, laptop computer, tablet computer, home entertainment computer, network computing device, mobile computing device, mobile communication device, gaming device, mainframe computer, server computer, etc.

Display device 20 includes a logic subsystem 130 and a data-holding subsystem 132. Display device 20 may include a display 22a, communication subsystem 134, and/or other components not shown in FIG. 1. Display device 20 may also optionally include user input devices such as remote controllers, keyboards, mice, game controllers, cameras, microphones, and/or touch screens, for example.

Logic subsystem 130 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 132 may include one or more physical, non-transitory, devices configured to hold data and/or instructions executable by the logic subsystem to implement the herein described methods and processes. When such methods and processes are implemented, the state of data-holding subsystem 132 may be transformed (e.g., to hold different data).

Data-holding subsystem 132 may include removable media and/or built-in devices. Data-holding subsystem 132 may include optical memory devices (e.g., CD, DVD, HD-DVD, Blu-ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 132 may include devices with one or more of the following characteristics: volatile, nonvolatile, dynamic, static, read/write, read-only, random access, sequential access, location addressable, file addressable, and content addressable. In some embodiments, logic subsystem 130 and data-holding subsystem 132 may be integrated into one or more common devices, such as an application specific integrated circuit or a system on a chip.

FIG. 1 also shows an aspect of the data-holding subsystem in the form of removable computer-readable storage media 136, which may be used to store and/or transfer data and/or instructions executable to implement the herein described methods and processes. Removable computer-readable storage media 136 may take the form of CDs, DVDs, HD-DVDs, Blu-ray Discs, EEPROMs, and/or floppy disks, among others.

The terms "module," "program," and "engine" may be used to describe an aspect of display device 20 that is implemented to perform one or more particular functions. In some cases, such a module, program, or engine may be instantiated via logic subsystem 130 executing instructions held by data-holding subsystem 132. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

Display 22a may be used to present a visual representation of data held by data-holding subsystem 132. As the herein described methods and processes change the data held by the data-holding subsystem, and thus transform the state of the data-holding subsystem, the state of display 22a may likewise be transformed to visually represent changes in the underlying data. Display 22a may include one or more display devices utilizing virtually any type of technology. Such display devices may be combined with logic subsystem 130 and/or data-holding subsystem 132 in a shared enclosure, or such display devices may be peripheral display devices.

When included, communication subsystem 134 may be configured to communicatively couple display device 20 with one or more other computing devices. Communication subsystem 134 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow display device 20 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A display receiver device, comprising:
one or more source inputs, each of the one or more source inputs configured to receive a content signal from a corresponding content source;
a content identification module to send sample information derived from video or audio portions of each received content signal to a signature processor and to receive from the signature processor content information for each corresponding content source, the content information for a particular content source indicating a content item embodied by the content signal received from that particular content source; and
an association module to associate the content item corresponding to the particular content source with one or more associated content items not corresponding to the particular content source.

2. The display receiver device of claim 1, where the association module is configured to cooperate with a remote association service to associate the content item corresponding to the particular content source with one or more associated content items not corresponding to the particular content source.

3. The display receiver device of claim 1, where the association module is configured to provide a content recommendation including the one or more associated content items.

4. The display receiver device of claim 1, where the association module is configured to record the one or more associated content items.

5. The display receiver device of claim 1, where the association module is configured to provide permission for the one or more associated content items to be accessed via another device.

6. A display receiver device, comprising:
one or more source inputs, each of the one or more source inputs configured to receive a content signal from a corresponding content source;
a content identification module to send sample information derived from video or audio portions of each received content signal to a signature processor and to receive from the signature processor content information for each corresponding content source, the content information for a particular content source indicating a content item embodied by the content signal received from that particular content source; and
a reporting module to provide a consumption report detailing content consumption via each source input, the reporting module configured to use content information received via the content identification module to provide the consumption report.

7. The display receiver device of claim 6, where the reporting module is configured to send the consumption report to a reporting service via a network.

8. The display receiver device of claim 7, where the reporting service is configured to aggregate the consumption report with one or more other consumption reports received from one or more other display devices.

9. The display receiver device of claim 7, where the reporting module is configured to receive information from the reporting service based on the consumption report.

10. The display receiver device of claim 6, where the consumption report includes a time period of viewing for the content item.

11. The display receiver device of claim 10, where the consumption report further includes which different content item, as identified via the content identification module, interrupts viewing of the content item.

12. The display receiver device of claim 6, further comprising a local signature acquisition module to sample the content signal received by each source input and to prepare the sample information for the content identification module.

13. The display receiver device of claim 12, where the local signature acquisition module is configured to concurrently sample content signals received by two or more source inputs.

14. The display receiver device of claim 12, where the local signature acquisition module is configured to sequentially sample content signals received by different source inputs.

15. The display receiver device of claim 12, where the local signature acquisition module is configured to presample content signals received by different source inputs when a display of the display receiver device is turned off.

16. The display receiver device of claim 6, where the consumption report further includes user profile information.

* * * * *